United States Patent [19]

Jorgenson

[11] Patent Number: 5,303,105

[45] Date of Patent: Apr. 12, 1994

[54] SHAPE MEMORY ALLOY FOR CENTERING A TRANSDUCER CARRIED BY A SLIDER IN A SUPPORT ARM OVER A TRACK ON A MAGNETIC DISK

[75] Inventor: David J. Jorgenson, St. Louis Park, Minn.

[73] Assignee: Seagate Technology, Inc., Scotts Valley, Calif.

[21] Appl. No.: 991,518

[22] Filed: Dec. 16, 1992

Related U.S. Application Data

[63] Continuation of Ser. No. 555,078, Jul. 18, 1990, abandoned.

[51] Int. Cl.$^5$ .............................................. G11B 5/55
[52] U.S. Cl. ................................... 360/106; 360/77.02
[58] Field of Search ............... 360/103, 104, 105, 106, 360/107, 109, 77.02

[56] References Cited

U.S. PATENT DOCUMENTS

| | | | |
|---|---|---|---|
| 954,682 | 4/1910 | Low et al. | |
| 3,029,318 | 4/1962 | Fay et al. | 179/100.2 |
| 3,573,768 | 4/1971 | Harris | 340/174.1 |
| 3,706,861 | 12/1972 | Giel | 179/100.2 |
| 3,754,151 | 8/1973 | Clark | 290/1 |
| 4,099,211 | 7/1978 | Hathaway | 360/109 |
| 4,167,763 | 9/1979 | Kubota | 360/77 |
| 4,172,265 | 10/1979 | Sakamoto et al. | 360/70 |
| 4,268,880 | 5/1981 | Majima | 360/109 |
| 4,348,624 | 9/1982 | Anderson et al. | 318/634 |
| 4,374,402 | 2/1983 | Blessom et al. | 360/104 |
| 4,398,228 | 8/1983 | Bauck | 360/77 |
| 4,404,605 | 9/1983 | Sakamoto | 360/77 |
| 4,415,939 | 11/1983 | Ballard | 360/75 |
| 4,514,776 | 4/1985 | Koyama et al. | 360/121 |
| 4,553,184 | 11/1985 | Ogishima | 360/103 |
| 4,709,284 | 11/1987 | Endo et al. | 360/103 |
| 4,814,908 | 3/1989 | Schmitz | 360/77.02 |
| 4,835,640 | 5/1989 | Endo et al. | 360/103 |
| 5,047,883 | 9/1991 | Aldrich et al. | 360/109 |

FOREIGN PATENT DOCUMENTS

| | | |
|---|---|---|
| 52-49014 | 4/1977 | Japan . |
| 53-3207 | 1/1978 | Japan . |
| 60-147924 | 5/1985 | Japan . |
| 60-147925 | 5/1985 | Japan . |
| 60-147926 | 5/1985 | Japan . |
| 61-979 | 6/1986 | Japan . |
| 61-74103 | 7/1986 | Japan . |
| 0368268 | 5/1990 | United Kingdom . |

OTHER PUBLICATIONS

*Shape-Memory Metal Acutates Disc Drive Head,* by Lyle H. McCarty, Western Editor, Design News Oct. 1986 Cahners Publishing Company.

IBM Technical Disclosure Bulletin, "Bimetallic Variable Head Load/Unload Device", vol. 20 No. 6 (Nov. 1977) pp. 2411-2412.

IBM Technical Disclosure Bulletin, "Bimetallic Mechanism for Loading and Unloading Magnetic Heads", vol. 23 No. 9 (Feb. 1981) pp. 4268-4269.

Anderson et al., Xerox Disclosure Journal, "Thermal Servo System for Mechanical Positioning", vol. 5 No. 5 (Oct. 1980) p. 549.

IBM Technical Disclosure Bulletin, vol. 16 No. 5, Oct. 73, p. 1429.

*Primary Examiner*—A. J. Heinz
*Attorney, Agent, or Firm*—Kinney & Lange

[57] ABSTRACT

An apparatus positions a transducer, carried by a slider, over a track on a magnetic disk. An arm has a first end for attachment to an actuator for rotating the arm and a second end for attachment to the slider. The arm also has an arm portion extending between the first and second ends. A shape memory alloy is coupled to the arm portion. Thermal energy is selectively applied to the shape memory alloy to cause corresponding deformation of the shape memory alloy causing the arm portion to deflect and move the second end along an arcuate path in a plane substantially transverse to the track.

63 Claims, 6 Drawing Sheets

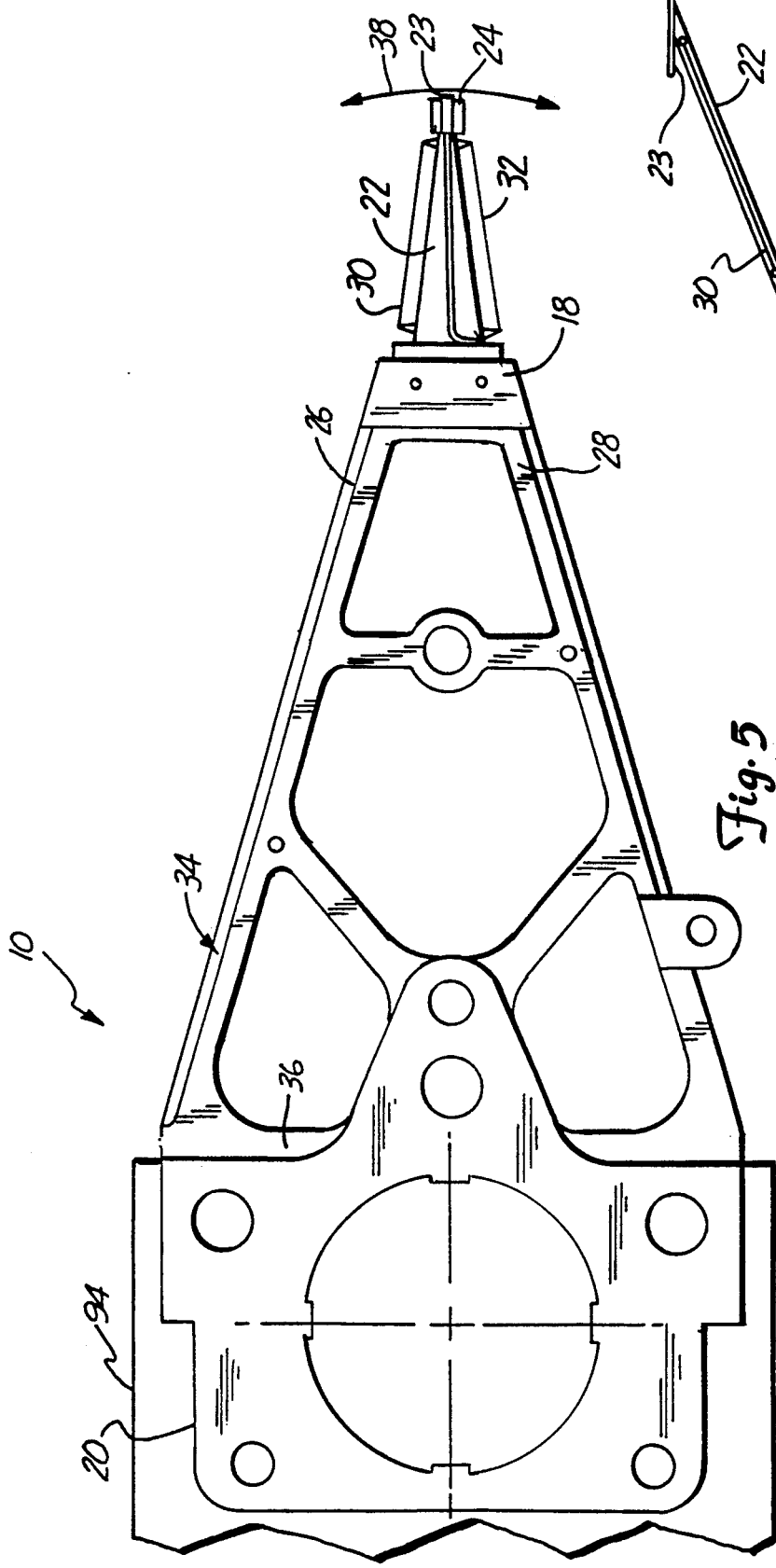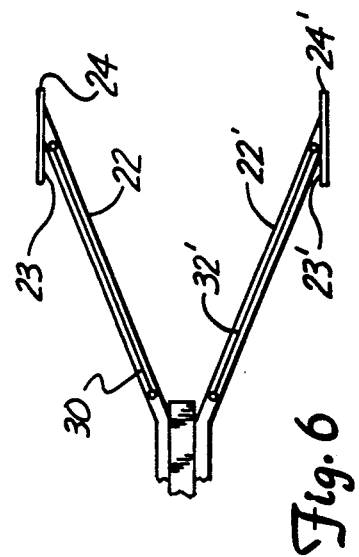
Fig. 5
Fig. 6

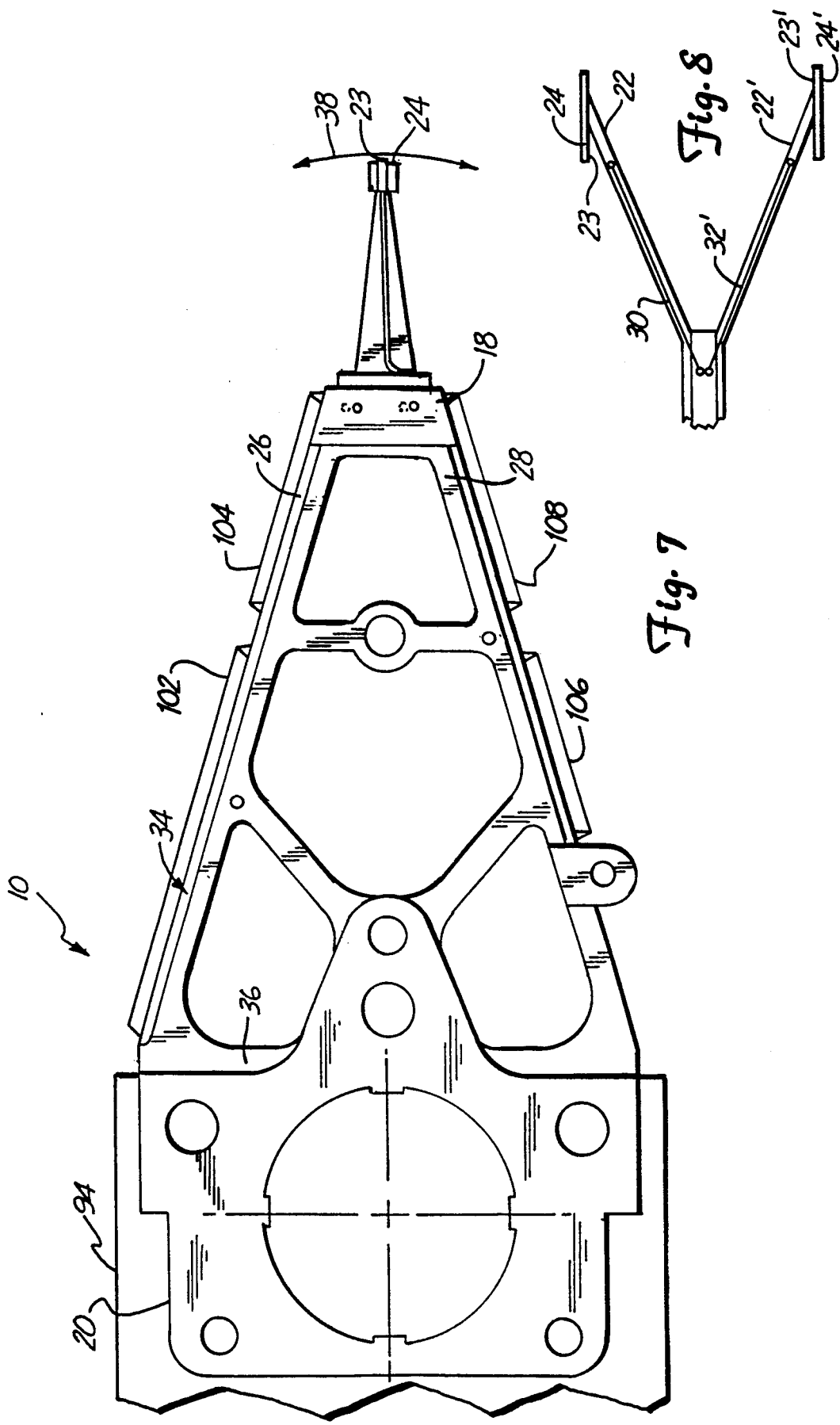

SHAPE MEMORY ALLOY FOR CENTERING A TRANSDUCER CARRIED BY A SLIDER IN A SUPPORT ARM OVER A TRACK ON A MAGNETIC DISK

This is a continuation of application Ser. No. 07/555,078 filed on Jul. 18, 1990, which is now abandoned.

BACKGROUND OF THE INVENTION

The present invention relates to positioning an arm over tracks on a disk. More particularly, the present invention relates to centering a transducer over information-carrying tracks on a magnetic disk.

In disk drive systems, there is typically a stack of disks where the disks are spaced apart and mounted on a spindle. Data heads, which carry transducers that read and write information on the disks, are attached to arms which extend between the disks so that the data heads fly over the disks. The arms are attached to an actuator which is moved to position the data heads over data tracks on the disks. If the data heads are to reliably read and write information on the disk, the transducers must be centered over the data tracks. Therefore, a closed loop feedback system is desirable for positioning the data heads over the tracks.

One method of positioning the data heads in the disk drive system over the tracks on the disk which uses a closed loop feedback circuit is called the dedicated servo method. In the dedicated servo method, one data head and one disk in the disk drive system are dedicated to the task of acquiring position information. The dedicated data head is referred to as to the servo head and the dedicated disk is referred to as the servo disk. The servo head is connected to a designated servo arm which is coupled to the same actuator as the other arms. The servo head is held over the center of a desired track on the servo disk by a closed loop servo system which utilizes feedback from specially written data on the servo disk to properly position the actuator. Since the other arms are rigidly attached to the actuator, they follow the servo arm and are positioned over the desired tracks on their respective disks.

Although the servo head is in the closed loop feedback system with the servo disk, the other data heads and other disks in the disk drive do not have the benefit of a separate closed loop feedback system to assure that they are properly positioned. Thus, in order to function properly, the other disks and heads must maintain their original position with respect to the servo head and the servo disk over extended periods of time. Maintaining this position is often difficult because of shifts in the relative head position due to temperature extremes and mechanical wear. If all the data heads, arms and disks do not maintain their positions relative to the servo head and the servo disk, off-track errors will result. Off-track errors reduce read margins and may cause data errors.

REFERENCE TO COPENDING APPLICATION

Two methods for correcting the problem of position shifting due to temperature extremes and mechanical wear are disclosed in copending applications which are assigned to the same assignee as the present application: THERMO SERVO FOR TRACK CENTERING ON A DISK, U.S. Pat. No. 4,814,908, issued Mar. 21, 1989; and APPARATUS FOR CENTERING A TRANSDUCER OVER A TRACK OF A MAGNETIC Disk, Ser. No. 390,178 filed Aug. 7, 1989. In these copending applications, either one or two heating elements, such as resistors, are embedded in each of the arms. When power is applied to the resistors, heat is generated. That heat causes expansion of the material in the arm, thereby bending the arm to move the head in an arcuate path which is substantially transverse to the tracks on the disk. A feedback loop is constructed around the head in which a parameter of the read back signal is compared to a desired value to form an error term. The error term is then used to set the power level which is applied to the heating elements. In this way, the position of each arm is independently controlled.

While these systems have significant advantages, they also have shortcomings. First, as disk drive capacities increase, more disks are expected to fit in the stack of disks mounted on the spindle. Also, as disk drive package sizes decrease, components within the disk drive must also get smaller. Because of these two factors, it is becoming necessary for data arms to be made thinner. As the thickness of the data arms decreases, it is more difficult to provide a resistor small enough to fit in the reduced space in the data arm, yet large enough to create the thermal energy required to bend the arm and reposition the transducer.

Another disadvantage of the previous systems is the power required for their implementation. The amount of current required to heat the arm enough to cause desired repositioning can be significant.

SUMMARY OF THE INVENTION

The present invention is an apparatus which centers a transducer, carried by a slider, over a track on a magnetic disk in a disk drive system, without applying thermal energy directly to data arms in the disk drive system. In the present invention, an arm has a first end for attachment to an actuator for rotating the arm and a second end for attachment to a slider. An arm portion extends between the first and second ends. Shape memory alloy means is coupled to the arm portion. Also, means are provided for selectively applying thermal energy to the shape memory alloy means to cause corresponding deformation of the shape memory alloy means. This deformation causes the arm portion to deflect and move the second end along an arcuate path in a plane substantially transverse to the track. This movement positions the transducer over the center of the track.

BRIEF DESCRIPTION OF THE DRAWINGS

FIG. 1A is a greatly enlarged embodiment of the shape memory alloy apparatus of the present invention.

FIG. 2A is a greatly enlarged portion of the arm showing one embodiment of the connection between the shape memory alloy and the arm.

FIG. 5 shows a second embodiment of the centering apparatus of the present invention.

FIG. 6 is a side view of a pair of flexures shown in FIG. 5.

FIG. 7 is another embodiment of the centering apparatus of the present invention.

FIG. 8 is another embodiment of the centering apparatus of the present invention.

DETAILED DESCRIPTION OF THE PREFERRED EMBODIMENTS

Figure 1:
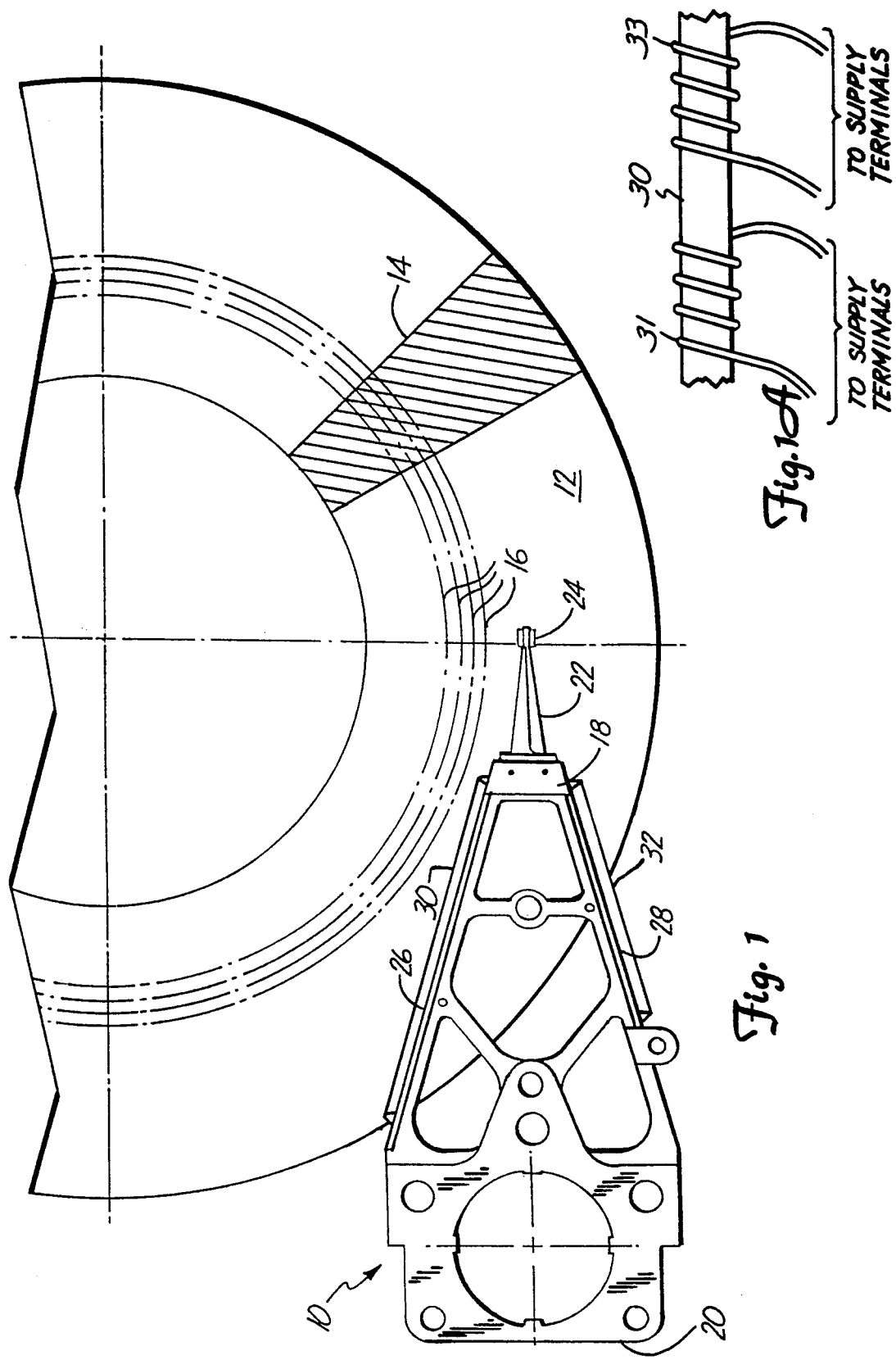
FIG. 1 is a top view of an arm positioned over a magnetic disk snowing a centering apparatus in accordance with the present invention.

FIG. 1 shows one embodiment of the present invention. A thermally compensated arm 10 is shown positioned over a magnetic disk 12. The magnetic disk 12 includes a plurality of zones, including position zone 14. Also, magnetic disk 12 includes a plurality of tracks 16.

Arm 10 includes free end 18 and attached end 20. Flexure 22 is attached to free end 18 and to a slider 24. Attached end 20 of arm 10 is attached to an actuator (not shown) which pivots arm 10 to move transducer 24 from track to track on magnetic disk 12.

Arm 10 also includes a first side 26 and a second side 28. A first shape memory alloy wire (SMA wire) 30 and a second SMA wire 32 are shown attached to first side 26 and second side 28, respectively, of arm 10. SMA wires 30 and 32 are typically 50% titanium and 50% nickel and have a nominal diameter of 0.008 inches. When SMA wires 30 and 32 are heated, they change shape by contracting in length in response to the heat. When SMA wires 30 and 32 cool, they return to their original shapes.

Therefore, when SMA wire 30 is heated, it contracts as a function of the coefficient of linear expansion for the particular material which is used to form SMA wire 30. This contraction causes arm 10 to bend or deflect. Consequently, transducer 24 moves in a direction across the particular track 16 which it is positioned over. When SMA wire 30 cools, it expands back to its original length and transducer 24 moves across the particular track 16 in the opposite direction.

Similarly, when SMA wire 32 heats up, it contracts in length as a function of the coefficient of linear expansion for the particular material which is used to form SMA wire 32. This contraction causes arm 10 to bend or deflect. Consequently, transducer 24 moves in a direction across the particular track 16 over which it is positioned. When SMA wire 32 cools, it expands back to its original length and transducer 24 moves across the track in the opposite direction. The range of movement described above (which is typically in terms of microinches) and the particular direction of movement depends on the geometry and material make-up of arm 10, the material from which SMA wires 30 and 32 are made and the temperature rise or drop in SMA wires 30 and 32.

SMA wires 30 and 32 can be heated in a variety of ways including applying power directly to the SMA wire, thereby generating heat, or using an external heater such as a wire wrapped heating element, an etched process heater or a conductive polymer. Applying power directly to the SMA wire takes less power than using an external heating element and is, therefore, a preferred embodiment. However, another embodiment for heating SMA wires 30 and 32 is shown in FIG. 1A. FIG. 1A shows a greatly enlarged portion of SMA wire 30 wrapped with two wire wrapped heating elements 31 and 33. Wire wrapped heating elements 31 and 33 are typically very thin strands of wire, electrically islolated from the SMA wire 30 with polyimide insulation.

In another embodiment, elements 31 and 33 are coiled strands of wire located near, but electrically isolated from SMA wire 30. In this preferred embodiment, Kapton is used to provide the electrical isolation.

When power is applied directly to SMA wire 30, the ends of SMA wire 30 are coupled to a heating element power supply which is discussed in greater detail later. When heating elements 31 and 33 are used, the ends of heating elements 31 and 33 are coupled to the heating element power supply. In either case, as the power supply supplies power to SMA wire 30 or the heating elements 31 and 33, heat is generated and thermal energy is applied to SMA wire 30 causing the desired contraction of SMA wire 30. When power is removed, SMA wire 30 cools and returns to its original length.

Although heating SMA wire 30 can be done with only one continuous heating element, a plurality of heating elements may be desirable. By providing a plurality of heating elements around SMA wire 30, it is possible to heat up only isolated portions of SMA wire 30 in order to cause different levels of contraction in SMA wire 30. By selectively controlling a plurality of heating elements (such as heating elements 31 and 33), the distance of linear contraction of SMA wire 30 and hence the amount of movement of transducer 24 can be tightly controlled.

Figure 2:
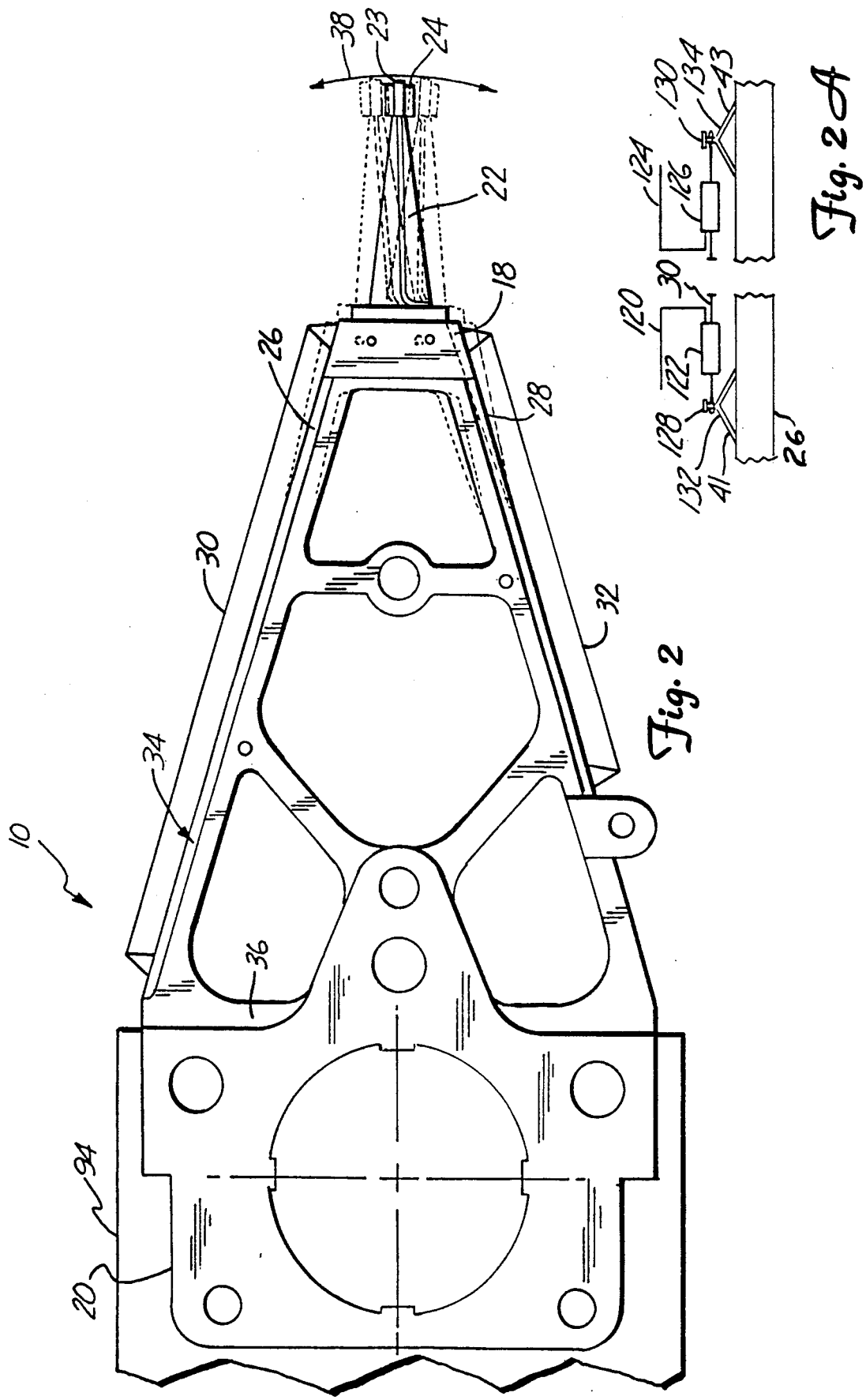
FIG. 2 is an enlarged diagram of the arm shown in FIG. 1.

FIG. 2 illustrates the motion of arm 10 during operation. In the illustrated embodiment, arm 10 is shown essentially as a triangle 34 having fixed base 36 and two legs. When SMA wire 30 is heated, it contracts causing arm 10 to deflect or bend. The resulting motion of transducer 24, which is attached to flexure 22 by slider 23, is essentially along an arc 38.

Similarly, as SMA wire 32 is heated, it contracts resulting in movement of transducer 24 along arc 38 caused by deflection or bending of arm 10. The nominal position (the position of transducer 24 when neither SMA wire 30 nor SMA wire 32 are heated) is shown in solid lines in FIG. 2. Two additional positions of arm 10 are shown in dashed lines. The amount of actual movement is very slight and the two additional positions are greatly exaggerated in order to illustrate the motion. Furthermore, in order to keep FIG. 2 from becoming cluttered, dashed lines are shown only along the free end 18 of arm 10. It is worth noting that, since the degree of desired movement of transducer 24 along arc 38 is generally very slight, SMA wires 30 and 32 may only need to be a fraction of an inch in total length. However, for the sake of clarity, they are shown running virtually the entire length of arm 10 and the movement of transducer 24 is greatly exaggerated.

FIG. 2A is an enlarged view of a portion of side 26 and SMA wire 30. SMA wires 30 and 32 can be mechanically coupled to arm 10 in a variety of ways. FIG. 2A shows one preferred embodiment. In FIG. 2A, mechanical mounting posts 41 and 43 are formed integrally with side 26 of arm 10. During assembly, a first end of SMA wire 30 is crimped to a first power supply wire 120 with crimp connector 122. A second end of SMA wire 30 is crimped to a second power supply wire 124 within crimp connector 126. SMA wire 30 makes electrical contact with power supply wires 120 and 124 in crimp connectors 122 and 126, respectively.

Crimp connectors 122 and 126 are mechanically coupled to mounting posts 41 and 43 by screws 128 and 130. Crimp connectors 122 and 126 electrically isolate SMA wire 30 from arm 10. Alternatively, SMA Wire 30 can be electrically isolated from arm 10 by using screws 128 and 130 formed of nonconductive material, and insulator pads 132 and 134 mounted between the crimp connectors and arm 10. This same mounting arrangement can be accomplished with SMA wire 32.

Figure 3:
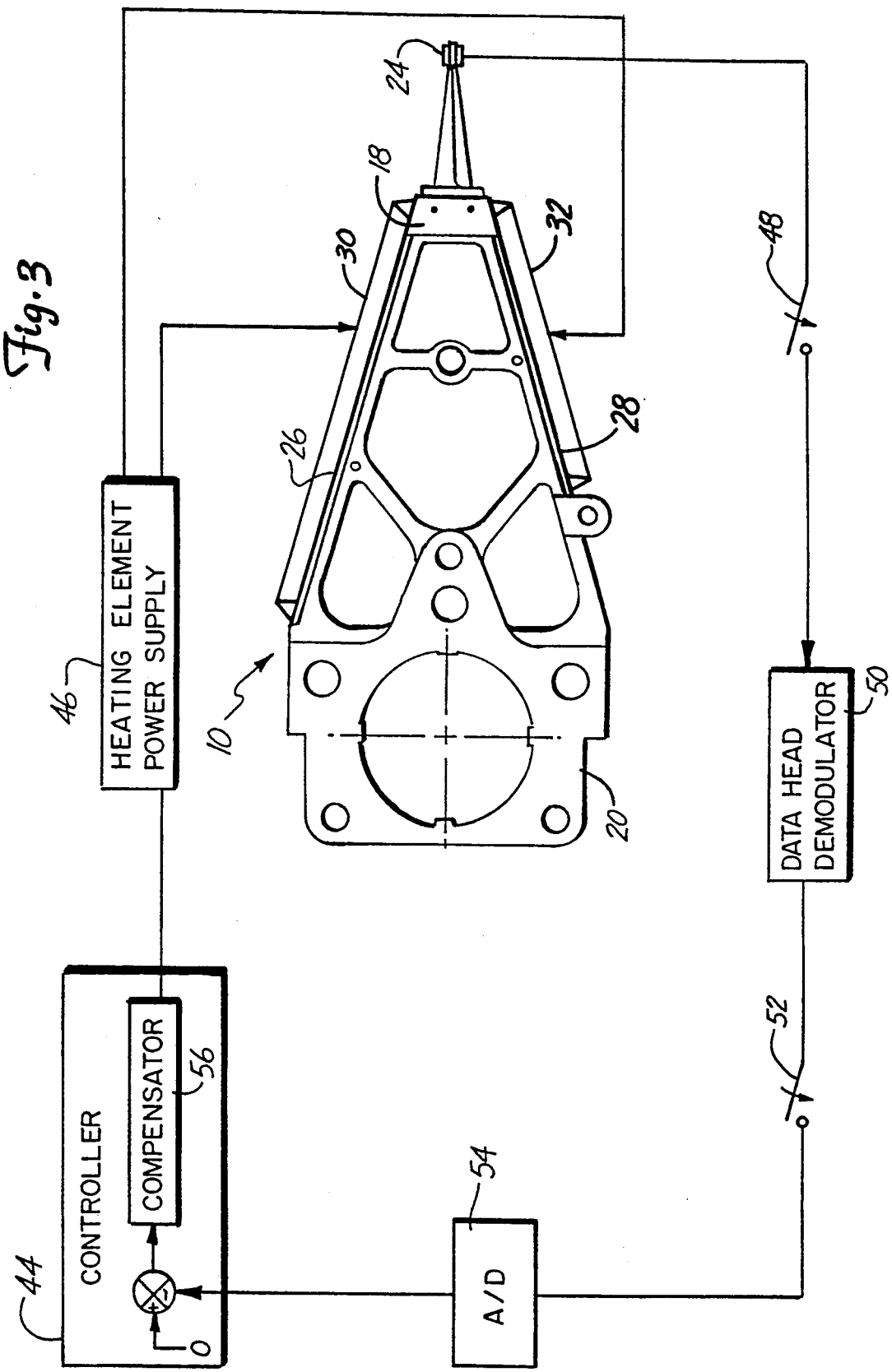
FIG. 3 shows the arm of FIG. 1 in a block diagram of a feedback loop.

FIG. 3 shows arm 10 as used in a feedback control circuit. The feedback control circuit includes controller 44, heating element power supply 46, head selector 48, data head demodulator 50 and switch 52. The feedback control circuit operates to center transducer 24 over the particular track 16 on magnetic disk 12 over which it is traveling.

With each revolution of magnetic disk 12 (shown in FIG. 1), transducer 24 passes over position information zone 14. Information is written in position information zone 14 such that, when it is decoded, it provides a voltage which is proportional to the distance that transducer 24 has moved from the center of track 16. Therefore, with each revolution of magnetic disk 12, a small burst of position information is read from magnetic disk 12.

Often, arm 10 is part of a large disk drive system including a plurality of arms. Therefore, arm (or head) selector 48 selects one of a plurality of arms to be repositioned. When arm 10 is selected, the position information read from the magnetic disk 12 by transducer 24 is supplied to data head demodulator 50. Data head demodulator 50 decodes the position information retrieved from magnetic disk 12 and provides an analog voltage which is proportional to the distance that transducer 24 has moved from the center of track 16. When analog switch 52 is closed, the analog voltage provided by data head demodulator 50 is provided to analog-to-digital (A/D) converter 54. A/D converter 54, in turn, provides a digital signal to controller 44 which is representative of the analog voltage provided by data head demodulator 50.

If transducer 24 were tracking directly over the center of track 16, the digital signal provided by A/D converter 54 would be zero and no position correction would be required. However, if controller 44 determines that the digital signal provided by A/D converter 54 is non-zero, then controller 44 must determine a correction value. To determine the correction value, controller 44 performs compensation calculations for a compensator 56 which outputs the correction value based on those calculations. The parameters of compensator 56 are chosen to compensate the digital signal provided by A/D converter 54 so that the control circuit has a desired response. In one preferred embodiment, compensator 56 is a digital filter. Controller 44 performs digital filter calculations for the digital filter thereby determining the correction value.

In the preferred embodiment shown, the correction value is a voltage which is supplied to heating element power supply 46. Heating element power supply 46 is capable of controlling power supplied to SMA wires 30 and 32 independently or, alternatively the heating elements used to heat SMA wires 30 and 32 (such as heating elements 31 and 33 shown in FIG. 11A) independently to produce an amount of heat which corresponds to the desired correction value. Power supply 46 generates a number of watts which corresponds to the correction value provided by controller 44. The SMA wires 30 and 32, or the heating elements corresponding to SMA wires 30 and 32, convert the power supplied to them into heat, thereby heating and causing contraction of SMA wires 30 or 32, respectively. Therefore, the correction value, which is provided to heating element power supply 46 in volts, is converted to microinches of movement through the interaction of heating element power supply 46, the heat generated in SMA wires 30 and 32 (or the heating elements corresponding to SMA wires 30 and 32) and the contraction force generated by SMA wires 30 and 32 upon being heated.

Also, since heating element power supply 46 is capable of controlling contraction of SMA wires 30 and 32 independently, power will normally be supplied to heat only one SMA wire, 30 or 32, to correct the position of arm 110. In other words, power will be supplied to heat SMA wire 30 for correction in one direction, and the power will be supplied to heat SMA wire 32 for correction in the opposite direction. Moreover, where no correction is required, there will be no power supplied to heat SMA wire 30 or SMA wire 32.

Figure 4:
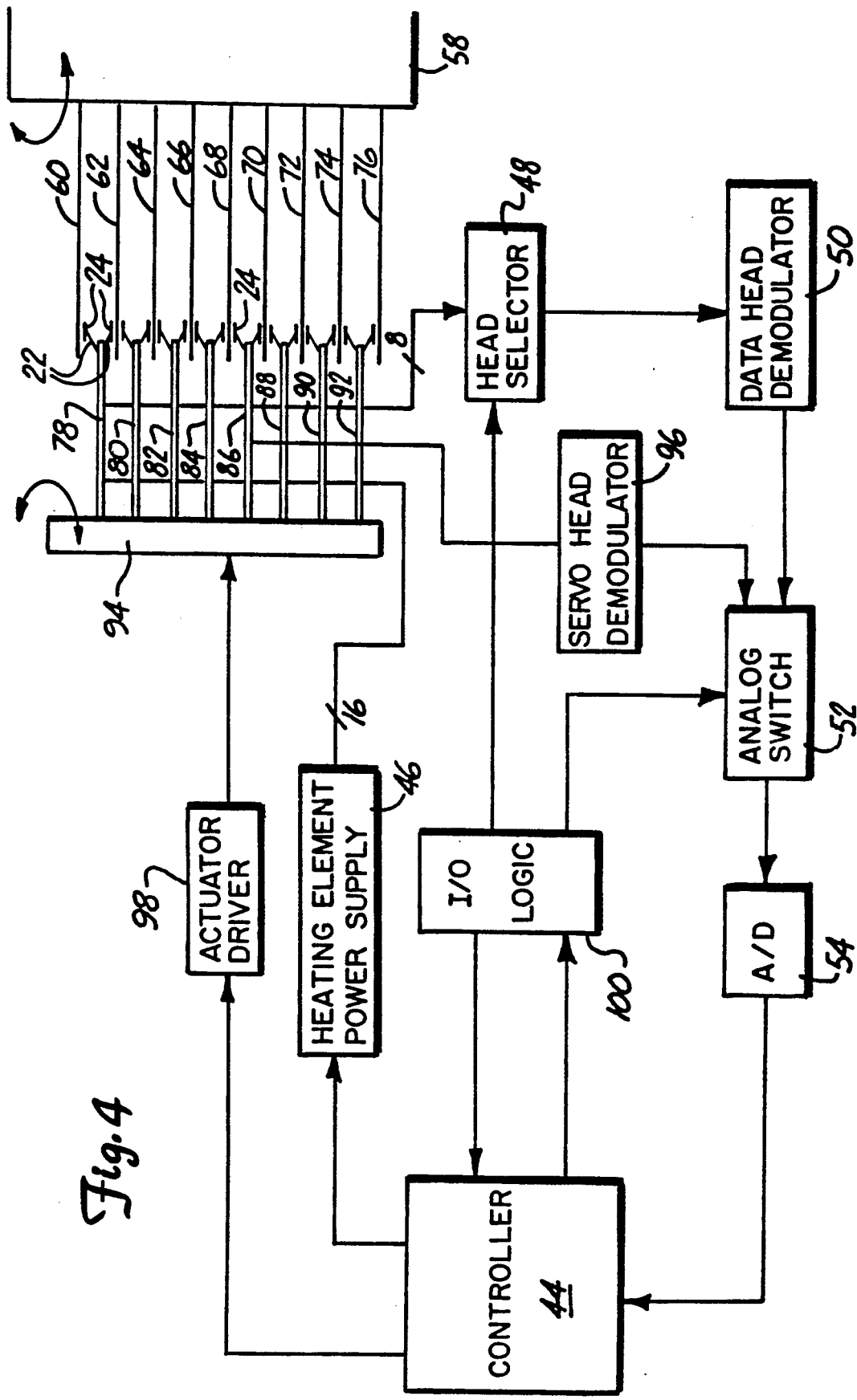
FIG. 4 shows a block diagram of a feedback control loop used with a plurality of arms.

FIG. 4 is a block diagram of a control circuit for controlling arm position in a disk drive system with a plurality of disks and a plurality of arms. The disk drive system includes a spindle 58 which supports the plurality of disks 60, 62, 64, 66, 68, 70, 72, 74 and 76 (collectively referred to as disks 60–76). Disks 60–76 are mounted for rotation with spindle 58. The disk drive system also includes a plurality of arms 78, 80, 82, 84, 86, 88, 90 and 92 (collectively referred to as arms 78–92) which are of substantially the same construction as arm 10 shown in FIGS. 1–3. Each of the arms 78–92 is provided with a pair of flexures 22 and a pair of transducers 24 (with the exception of arm 86 which has only one flexure 22 and one transducer 24). The transducers fly over surfaces on the disks 60–76. In addition, arms 78–92 are mounted to an actuator 94 which operates to pivot arms 78–92 from track to track on disks 60–76.

The control circuit includes controller 44, heating element power supply 46, head selector 48, data head demodulator 50, analog switch 52, A/D converter 54, servo head demodulator 96, actuator driver 98 and input/output (I/O) logic 100.

In the illustrated embodiment, arm 86 serves as a servo arm, and the transducer associated with arm 86 reads servo head position information from servo disk 68. The servo head position information is provided to servo head demodulator 96 which decodes the position information and provides an analog voltage indicating the position of servo arm 86 to analog switch 52. At regular intervals, controller 44 provides a signal to the I/O logic 100 causing analog switch 52 to pass the analog voltage provided by servo head demodulator 96 to A/D converter 54. A/D converter 54 provides a digital signal to the controller 44 which represents the analog voltage provided by servo head demodulator 96. Based on this digital signal, controller 44 calculates a correction value and provides it to actuator driver 98. Actuator driver 98, in turn, causes actuator 94 to rotate in response to the correction value to maintain transducer 24 on servo arm 86 over the center of the particular track 16 over which it is traveling.

At one point during each revolution of spindle 58, a signal from servo head demodulator 96 indicates that data head position zone 14 on disks 60–66 and 70–76 is about to pass transducers 24 on arms 78–84 and 88–92. At that point, I/O logic 100 switches head selector 48 to read position information from a desired arm 78–84 or 88–92. The data head demodulator, as discussed above, decodes the information provided by the selected arm into a voltage proportional to the distance that the transducer 24 on the selected arm has moved from the center of the track 16. Controller 44 samples this decoded information by causing I/O logic 100 to switch the analog switch 52 so that it passes the signal provided by data head demodulator 50. After the information is converted to a digital value by A/D converter 54, controller 44 performs digital filter computations and determines a correction value for the selected arm.

The correction value is provided to heating element power supply 46 which supplies enough power to produce an amount of heat necessary to cause contraction in the desired SMA wire corresponding to the selected arm. This contraction, in turn, causes movement of transducer 24 on the selected arm in an amount which corresponds to the desired correction value.

On the next revolution of spindle 58, I/O logic 100 causes head selector 48 to choose a different arm for correction. The position of the transducer on the selected arm is sampled by controller 44 and corrected through the heating element power supply 46. Similarly, on each subsequent revolution of spindle 58, head selector 48 chooses another arm for correction. Once all the arms have been sampled and corrected, the sequence of selection by head selector 48 is repeated. This results in a constant sample rate for each of the arms.

FIG. 5 shows another preferred embodiment of the repositioning apparatus of the present invention. Arm 10 shown in FIG. 5 is similar to that shown in FIG. 2 and is correspondingly numbered. The only difference is that SMA wires 30 and 32 are no longer mounted to sides 26 and 28 of arm 110. Rather, they are mounted to opposing sides of flexure 22. This embodiment has distinct advantages. As discussed with respect to FIG. 4, and as shown in FIG. 6, it is very common for each arm to be connected to a pair of flexures 22 and 22' where each flexure 22 and 22' is coupled to a transducer 24 or 24' via sliders 23 or 23'. If SMA wires 30 and 32 were coupled to sides 26 and 28 of arm 10, the repositioning achieved by heating either SMA wire 30 or 32 would reposition both of the transducers 24 and 24' with respect to their corresponding tracks 16.

In actuality, however, only one transducer 24 or 24' on each arm may require correction. With the embodiment shown in FIG. 5, each of the individual flexures 22 and 22' have a set of SMA wires 30 and 32, or 30' and 32', respectively. Therefore, by controlling heating of SMA wires 30 and 32, as well as 30' and 32' independently, repositioning of transducers 24 and 24' is independently controlled. This allows greater tracking accuracy of the transducers within the disk drive system.

FIG. 7 shows yet another preferred embodiment of the repositioning apparatus of the present invention. Arm 10 shown in FIG. 7 is similar to those shown in FIGS. 2 and 5 and is correspondingly numbered. However, rather than having only a single SMA wire attached to each side 26 and 28 of arm 10, the embodiment shown in FIG. 7 provides a plurality of SMA wires attached to side 26 of arm 10, as well as a plurality of SMA wires attached to side 28 of arm 10.

SMA wires 102 and 104 are each attached to side 26 of arm 10. The heating of SMA wires 102 and 104 is independently controlled. Therefore, the amount of deflection or bending of arm 10 can be controlled in a step-wise fashion. For example, to achieve the greatest degree of bending, both SMA wires 102 and 104 are heated. Alternatively, where less bending is required, either SMA wire 102 or 104 is heated. Also, SMA wire 104 can be made significantly shorter than SMA wire 104. Hence, coarse and fine positioning could be accomplished by independently controlling application of thermal energy to SMA wires 102 and 104.

Similarly, SMA wires 106 and 108 are both attached to side 28 of arm 10. SMA wires 106 and 108 can be independently controlled in the same manner as SMA wires 102 and 104 thereby controlling deflection of arm 10 in a step-wise manner. By implementing a plurality of SMA wires on sides 26 and 28 of arm 10, movement of transducer 24 along arc 38 is more tightly controllable than if only a single SMA wire were provided on each side 26 and 28 of arm 10. This allows greater accuracy when repositioning transducer 24 within a track 16 on magnetic disk 12.

An additional embodiment of the present invention is shown in FIG. 8. This is very similar to that shown in FIGS. 5 and 6. The only difference is that SMA wires 30, 32, 30' and 32' are coupled at one end, to flexures 22 and 22', and at the other end, to arm 10. With this embodiment, as with the embodiment described with reference to FIGS. 5 and 6, micropositioning of transducers 24 and 24' is independently controllable.

CONCLUSION

The present invention provides the advantages of thermally controlled micropositioning of transducers in a disk drive system without the requirement for applying thermal energy directly to the data arm itself. Rather, thermal energy is applied to a shape memory alloy attached to the arm. Causing deformation of the shape memory alloy requires less thermal energy than causing thermal expansion within the arm itself. Therefore, repositioning can be accomplished by using a smaller heating element, or by eliminating the heating element and applying power directly to the shape memory alloy. This allows micropositioning of individual data arms, and in several embodiments, of individual transducers, in disk drive systems while still allowing the disk drive package sizes to decrease and while still accommodating for decreases in the thickness of the arms within the disk drive system.

Although the present invention has been described with reference to preferred embodiments, workers skilled in the art will recognize that changes may be made in form and detail without departing from the spirit and scope of the invention.

What is claimed is:

1. An apparatus for repositioning a transducer, carried by a slider, over a track on a magnetic disk, comprising:

an arm having a first end for attachment to an actuator for rotating the arm, a second end for attachment to the slider, and an arm portion extending between the first and second ends;

shape memory alloy means, responsive to thermal energy to deform the shape memory alloy means, being coupled to the arm portion for deforming the arm upon deformation of the shape memory alloy means; and means for selectively applying thermal energy to the shape memory alloy means to cause corresponding deformation of the shape memory alloy means causing the arm to deform and move the second end along an arcuate path in a plane substantially transverse to the track to position the transducer over a center of the track.

2. The apparatus of claim 1 wherein the arm portion comprises:

a data arm portion adapted for being coupled to the actuator; and a first flexure, coupled at a first end to the data arm portion, having a second end adapted for being coupled to a first slider.

3. The apparatus of claim 2 wherein the shape memory alloy means is coupled to the data arm portion.

4. The apparatus of claim 3 wherein the shape memory alloy means comprises:

a first shape memory alloy element coupled to one side of the data arm portion, deformation of the first shape memory alloy element causing the second end of the first flexure to move along the arcuate path in a first direction; and a second shape memory alloy element coupled to a second side of the data arm portion, the second side being generally opposite the first side, and deformation of the second shape memory alloy element causing the second end of the first flexure to move along the arcuate path in a second direction generally opposite the first direction.

5. The apparatus of claim 2 wherein the shape memory alloy means is coupled to the first flexure.

6. The apparatus of claim 5 wherein the shape memory alloy means comprises:

a first shape memory alloy element coupled to one side of the first flexure, deformation of the first shape memory alloy element causing the second end of the first flexure to move along the arcuate path in a first direction; and a second shape memory alloy element coupled to a second side of the first flexure, the second side being generally opposite the first side, and deformation of the second shape memory alloy element causing the second end of the first flexure to move along the arcuate path in a second direction generally opposite the first direction.

7. The apparatus of claim 6 wherein the arm portion further comprises:

a second flexure, coupled at a first end to the data arm portion, having a second end adapted for being coupled to a second slider.

8. The apparatus of claim 7 wherein the shape memory alloy means further comprises:

second shape memory alloy means coupled to the second flexure.

9. The apparatus of claim 8 wherein the second shape memory alloy means comprises:

a third shape memory alloy element coupled to one side of the second flexure, deformation of the third shape memory alloy element causing the second end of the second flexure to move along the arcuate path in a first direction; and a fourth shape memory alloy element coupled to a second side of the second flexure, the second side being generally opposite the first side, and deformation of the fourth shape memory alloy element causing the second end of the second flexure to move along the arcuate path in a second direction generally opposite the first direction.

10. The apparatus of claim 8 wherein the means for selectively applying thermal energy comprises:

first energy means for selectively applying thermal energy to the first shape memory alloy means to cause corresponding deformation of the first shape memory alloy means causing the first flexure to deflect and move the second end of the first flexure along an arcuate path in a plane substantially transverse to the track; and second energy means for selectively applying thermal energy to the second shape memory alloy means to cause corresponding deformation of the second shape memory alloy means causing the second flexure to deflect and move the second end of the second flexure along an arcuate path in a plane substantially transverse to a track.

11. The apparatus of claim 2 wherein the shape memory alloy means is coupled at a first end to the data arm portion and at a second end to the first flexure.

12. The apparatus of claim 1 and further comprising:

position indicating means for providing a position signal indicating when the transducer is tracking off center; and heat control means for selectively controlling the amount of heat applied to the shape memory alloy means as a function of the position signal.

13. The apparatus of claim 12 wherein the magnetic disk has a plurality of sectors for containing information and wherein position data is recorded on at least one of the sectors of the magnetic disk, the position data indicating a distance that the transducer is from the center of the track.

14. The apparatus of claim 13 wherein the position indicating means includes means for producing a modulated signal representing the position data which the transducer passes over as the transducer passes over the sector containing the position data.

15. The apparatus of claim 14 wherein the position indicating means further comprises:

a demodulator for demodulating the modulated signal to produce a demodulated position signal.

16. The apparatus of claim 15 wherein the heat control means comprises:

compensation means for compensating the demodulated position signal to provide a compensated position signal;

correction means for determining a correction value based on the compensated position signal wherein the correction value represents the distance that the transducer is from the center of the track; and a heat control power supply which varies power delivered to the means for selectively applying thermal energy as a function of the correction value.

17. The apparatus of claim 1 wherein means for selectively applying thermal energy comprises:

a controllable power supply, coupled to the shape memory alloy means for controlling power delivered to the shape memory alloy means.

18. The apparatus of claim 17 wherein the means for selectively applying thermal energy comprises:

resistive heating element means, coupled to the controllable power supply and in thermal contact with the shape memory alloy means, for receiving power supplied by the controllable power supply.

19. The apparatus of claim 18 wherein the resistive heating element means comprises:

a plurality of resistive heating elements, each in thermal contact with the shape memory alloy means, wherein power delivered to each resistive heating element by the controllable power supply is selectively controllable.

20. The apparatus of claim 19 wherein the shape memory alloy means includes a plurality of shape memory alloy elements coupled to generally opposing sides of the arm portion.

21. The apparatus of claim 20 wherein at least a single resistive heating element is in thermal contact with each of the plurality of shape memory alloy elements.

22. The apparatus of claim 21 wherein a plurality of resistive heating elements are in thermal contact with each of the plurality of shape memory alloy elements.

23. The apparatus of claim 1 and further comprising:
a mechanical coupler coupling the shape memory alloy means to the arm portion such that at least a portion of the shape memory alloy means is spaced apart from the arm portion.

24. An apparatus for controlling tracking of a plurality of transducers, carried by a plurality of sliders, over tracks on a plurality of magnetic disks, at least one transducer corresponding to each disk, the apparatus comprising:
a plurality of arms, each having a first end for attachment to an actuator for rotating the arm, and a second end for attachment to one of the plurality of sliders, and the plurality of arms having arm portions, each arm having an arm portion extending between the first and second ends;
a plurality of shape memory alloy elements, at least one shape memory alloy element coupled to each of the arm portions; and
means for selectively applying thermal energy to selected shape memory alloy elements to cause corresponding deformation of the selected shape memory alloy elements causing selected deflection in the arm portions, thereby causing selected movement of the second ends along an arcuate path in a plane substantially parallel to the corresponding disk and substantially transverse to a track to position each transducer over a center of the track.

25. The apparatus of claim 24 wherein each arm portion comprises:
a data arm portion adapted for being coupled to the actuators; and
a first flexure, coupled at a first end to the data arm portion, having a second end adapted for being coupled to a first slider.

26. The apparatus of claim 25 wherein each data arm portion is coupled to at least one independent shape memory alloy element.

27. The apparatus of claim 26 wherein a first shape memory alloy element is coupled to one side of each data arm portion, deformation of the first shape memory alloy element causing the second end of the first flexure to move along the arcuate path in a first direction, and wherein a second shape memory alloy element is coupled to a second side of each data arm portion, the second side being generally opposite the first side, and deformation of the second shape memory alloy element causing the second end of the first flexure to move along the arcuate path in a second direction generally opposite the first direction.

28. The apparatus of claim 25 wherein each first flexure is coupled to at least one independent shape memory alloy elements.

29. The apparatus of claim 28 wherein a first shape memory alloy element is coupled to one side of a corresponding first flexure, deformation of the first shape memory alloy element causing the second end of the corresponding first flexure to move along the arcuate path in a first direction, and wherein a second shape memory alloy element is coupled to a second side of the corresponding first flexure, the second side being generally opposite the first side, and deformation of the second shape memory alloy element causing the second end of the corresponding first flexure to move along the arcuate path in a second direction generally opposite the first direction.

30. The apparatus of claim 29 wherein each arm portion further comprises:
a second flexure, coupled at a first end to the data arm portion, having a second end adapted for being coupled to a second slider.

31. The apparatus of claim 30 wherein at least one of the shape memory alloy elements is coupled to the second flexure of each arm portion.

32. The apparatus of claim 31 wherein a third shape memory alloy element is coupled to one side of a corresponding second flexure, deformation of the third shape memory alloy element causing the second end of the corresponding second flexure to move along the arcuate path in a first direction, and wherein a fourth shape memory alloy element is coupled to a second side of the corresponding second flexure, the second side being generally opposite the first side, and deformation of the fourth shape memory alloy element causing the second end of the corresponding second flexure to move along the arcuate path in a second direction generally opposite the first direction.

33. The apparatus of claim 24 wherein the shape memory alloy elements are coupled to the arm portions such that at least a portion of each shape memory alloy element is spaced from the arm portions.

34. The apparatus of claim 24 and further comprising:
arm selection means for selecting an arm to be corrected;
position indicating means for providing a position signal indicating when the transducer coupled to the selected arm is tracking off center; and
heat control means for selectively varying the amount of heat applied to the shape memory alloy elements coupled to the selected arm as a function of the position signal.

35. The apparatus of claim 34 wherein each magnetic disk has a plurality of sectors for containing information and wherein the position indicating means comprises:
position data recorded on at least one of the sectors of the magnetic disk corresponding to the selected arm, the position data indicating a distance that the transducer coupled to the selected arm is from the center of the track.

36. The apparatus of claim 35 wherein the position signal comprises:
a modulated signal representing the position data which the transducer coupled to the selected arm passes over as the transducer passes over the sector containing the position data.

37. The apparatus of claim 36 wherein the position indicating means further comprises:
a demodulator for demodulating the modulated signal to produce a demodulated position signal.

38. The apparatus of claim 37 wherein the heat control means comprises:
compensation means for compensating the demodulated position signal to provide compensated position signal;
correction means for determining a correction value based on the compensated position signal wherein the correction value represents the distance that the transducer coupled to the selected arm is from the center of the track; and a heat control power supply which varies power delivered to the shape memory alloy element coupled to the selected arm as a function of the correction value.

39. The apparatus of claim 24 wherein the means for selectively applying thermal energy comprises:

a controllable power supply, coupled to the shape memory alloy elements, for controlling power delivered to the shape memory alloy elements.

40. The apparatus of claim 39 wherein the means for selectively applying thermal energy comprises:

resistive heating element means, coupled to the controllable power supply and in thermal contact with the shape memory alloy elements, for receiving power supplied by the controllable power supply.

41. The apparatus of claim 40 wherein the resistive heating element means comprises:

a plurality of resistive heating elements, each in thermal contact with a shape memory alloy element, wherein power delivered to each resistive heating element by the controllable power supply is selectively controllable.

42. The apparatus of claim 41 wherein shape memory alloy elements are coupled to generally opposing sides of each of the arm portions and wherein each of the plurality of shape memory alloy elements is in thermal contact with at least a single, corresponding resistive heating element, each single resistive heating element corresponding to one of the plurality of shape memory alloy elements being independently, selectively controllable.

43. The apparatus of claim 42 wherein each of the plurality of shape memory alloy elements is in thermal contact with a plurality of corresponding resistive heating elements.

44. An apparatus for repositioning a transducer, carried by a slider, over a track on a magnetic disk, comprising:

an arm having a first end for attachment to an actuator for rotating the arm, a second end for attachment to the slider, and an arm portion extending between the first and second ends;

positioning means coupled to the arm portion for applying force to the arm when thermal energy is applied to the positioning means and for removing the force from the arm when thermal energy is removed from the positioning means; and means for selectively applying thermal energy to the positioning means to cause corresponding contraction of the positioning means causing the arm portion to deflect and move the second end along an arcuate path to adjust position of the second end with respect to a center of the track.

45. The apparatus of claim 44 wherein the arm portion comprises;

a data arm portion adapted for being coupled to the actuator; and a first flexure, coupled at a first end to the data arm portion, having a second end adapted for being coupled to a first slider.

46. The apparatus of claim 45 wherein the positioning means comprises:

a first positioning element coupled to one side of the data arm portion, contraction of the first positioning element causing the second end of the first flexure to move along the arcuate path in a first direction.

47. The apparatus of claim 46 wherein the positioning means further comprises:

a second positioning element coupled to a second side of the data arm portion, the second side being generally opposite the first side, and contraction of the second positioning element causing the second end of the first flexure to move along the arcuate path in a second direction generally opposite the first direction.

48. The apparatus of claim 45 wherein the positioning means comprises:

a first positioning element coupled to the first flexure, contraction of the first positioning element causing the second end of the first flexure to move along the arcuate path in a first direction.

49. The apparatus of claim 48 and further comprising:

a second positioning element, coupled to a second side of the first flexure, the second side being generally opposite the first side, and contraction of the second positioning element causing the second end of the first flexure to move along the arcuate path in a second direction generally opposite the first direction.

50. The apparatus of claim 49 wherein the arm portion further comprises:

a second flexure, coupled at a first end to the data arm portion, having a second end adapted for being coupled to a second slider.

51. The apparatus of claim 50 and further comprising:

a third positioning element, coupled to one side of the second flexure, contraction of the third positioning element causing the second end of the second flexure to move along the arcuate path in a first direction; and a fourth positioning element, coupled to a second side of the second flexure, the second side being generally opposite the first side, contraction of the fourth positioning element causing the second end of the second flexure to move along the arcuate path in a second direction generally opposite the first direction.

52. The apparatus of claim 45 wherein the positioning means is coupled, at a first end, to the data arm portion and, at a second end, to the first flexure.

53. The apparatus of claim 44 and further comprising:

position indicating means for providing a position signal indicating when the transducer is tracking off-center; and heat control means for selectively controlling the amount of heat applied to the positioning means as a function of the position signal.

54. The apparatus of claim 53 wherein the magnetic disk has a plurality of sectors for containing information and wherein position data is recorded on at least one of the sectors of the magnetic disk, the position data indicating a distance that the transducer is from the center of the track.

55. The apparatus of claim 54 wherein the position indicating means includes means for producing a modulated signal representing the position data which the transducer passes over as the transducer passes over the sector containing the position data.

56. The apparatus of claim 55 wherein the position indicating means further comprises:

a demodulator for demodulating the modulated signal to produce a demodulated position signal.

57. The apparatus of claim 56 wherein the heat control means comprises:
compensation means for compensating the demodulated position signal to provide a compensated position signal;
correction means for determining a correction value based on the compensated position signal wherein the correction value represents the distance that the transducer is from the center of the track; and
a heat control power supply which varies power delivered to the means for selectively applying thermal energy as a function of the correction value.

58. The apparatus of claim 44 wherein the means for selectively applying thermal energy comprises:
a controllable power supply, coupled to the positioning means, for controlling thermal energy delivered to the positioning means.

59. The apparatus of claim 58 wherein the means for selectively applying thermal energy comprises:
resistive heating element means coupled to the controllable power supply and in thermal contact with the positioning means, for receiving power supplied by the controllable power supply.

60. The apparatus of claim 59 wherein the resistive heating element means comprises:
a plurality of resistive heating elements, each in thermal contact with the positioning means, wherein power delivered to the resistive heating elements by the controllable power supply is selectively controllable.

61. The apparatus of claim 60 wherein the positioning means includes a plurality of positioning elements coupled to generally opposing sides of the arm portion and wherein at least a single resistive heating element is in thermal contact with each of the plurality of positioning elements.

62. The apparatus of claim 61 wherein a plurality of resistive heating elements are in thermal contact with each of the plurality of positioning elements.

63. The apparatus of claim 44 and further comprising:
a mechanical coupler, coupling the positioning means to the arm portion such that at least a portion of the positioning means is spaced apart from the arm portion.

* * * * *

UNITED STATES PATENT AND TRADEMARK OFFICE
CERTIFICATE OF CORRECTION

PATENT NO. : 5,303,105

DATED : April 12, 1994

INVENTOR(S) : DAVID J. JORGENSON

It is certified that error appears in the above-identified patent and that said Letters Patent is hereby corrected as shown below:

Col. 4, line 67, delete "Wire", insert --wire--

Col. 5, line 59, delete "FIG. 11A", insert --FIG. 1A--

Col. 6, line 11, delete "arm 110", insert --arm 10--

Col. 7, line 29, delete "arm 110", insert --arm 10--

Signed and Sealed this

Eighteenth Day of October, 1994

Attest:

BRUCE LEHMAN

*Attesting Officer*     *Commissioner of Patents and Trademarks*